US006735847B2

United States Patent
Roberts et al.

(10) Patent No.: US 6,735,847 B2
(45) Date of Patent: May 18, 2004

(54) ASSEMBLY LINE METHOD FOR AND METHOD OF PRODUCING ARMATURE COILS

(75) Inventors: Ricky L. Roberts, Erie, PA (US); Robert Henry Hartman, Erie, PA (US); Floyd Curry, Fairview, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/349,546

(22) Filed: Jan. 23, 2003

(65) Prior Publication Data

US 2003/0110616 A1 Jun. 19, 2003

Related U.S. Application Data

(63) Continuation of application No. 09/826,129, filed on Apr. 4, 2001, now Pat. No. 6,536,093.
(60) Provisional application No. 60/194,537, filed on Apr. 4, 2000.

(51) Int. Cl.[7] ............................ H02K 15/16; H02K 3/00
(52) U.S. Cl. ...................... 29/596; 29/598; 29/605; 29/606; 310/179; 310/184
(58) Field of Search ..................... 29/596, 598, 605, 29/606, 735; 242/444.2, 432; 310/179, 184, 189, 208

(56) References Cited

U.S. PATENT DOCUMENTS

| | | | | |
|---|---|---|---|---|
| 3,837,072 A | | 9/1974 | Moberg | 29/596 |
| 4,337,567 A | * | 7/1982 | Lugosi et al. | 29/596 |
| 4,405,553 A | | 9/1983 | Lovgren et al. | 264/272.19 |
| 4,417,388 A | | 11/1983 | Major | 29/598 |
| 5,115,556 A | | 5/1992 | Gavrilidis et al. | 29/596 |
| 5,722,153 A | * | 3/1998 | Holmes et al. | |
| 5,787,567 A | | 8/1998 | Miyazaki | 29/596 |
| 6,181,044 B1 | * | 1/2001 | Umeda et al. | 310/201 |

* cited by examiner

*Primary Examiner*—Peter Vo
*Assistant Examiner*—Stephen Kenny
(74) *Attorney, Agent, or Firm*—Cantor Colburn LLP

(57) ABSTRACT

A semi-automated method for forming armature coils comprising a plurality of transposed wire pairs includes joining a plurality of pairs of wires having offset segments along their lengths, wherein each pair of wires are in contiguous, surface-to-surface engagement with each other along a length defining said each pair of wires, insulating each of the transposed pairs of wires, assembling the plurality of the insulated transposed pairs of wires with the transpositions being staggered to create a pack, and forming the pack into an armature coil in an automated coil forming machine by bending the pack in two planes. The joining of the plurality of pairs of wires having the offset segments along their lengths is effectuated at a transposition point. Each pair of wires has a transposition at a unique point relative to others of the plurality of the pairs of wires forming the coils.

22 Claims, 10 Drawing Sheets

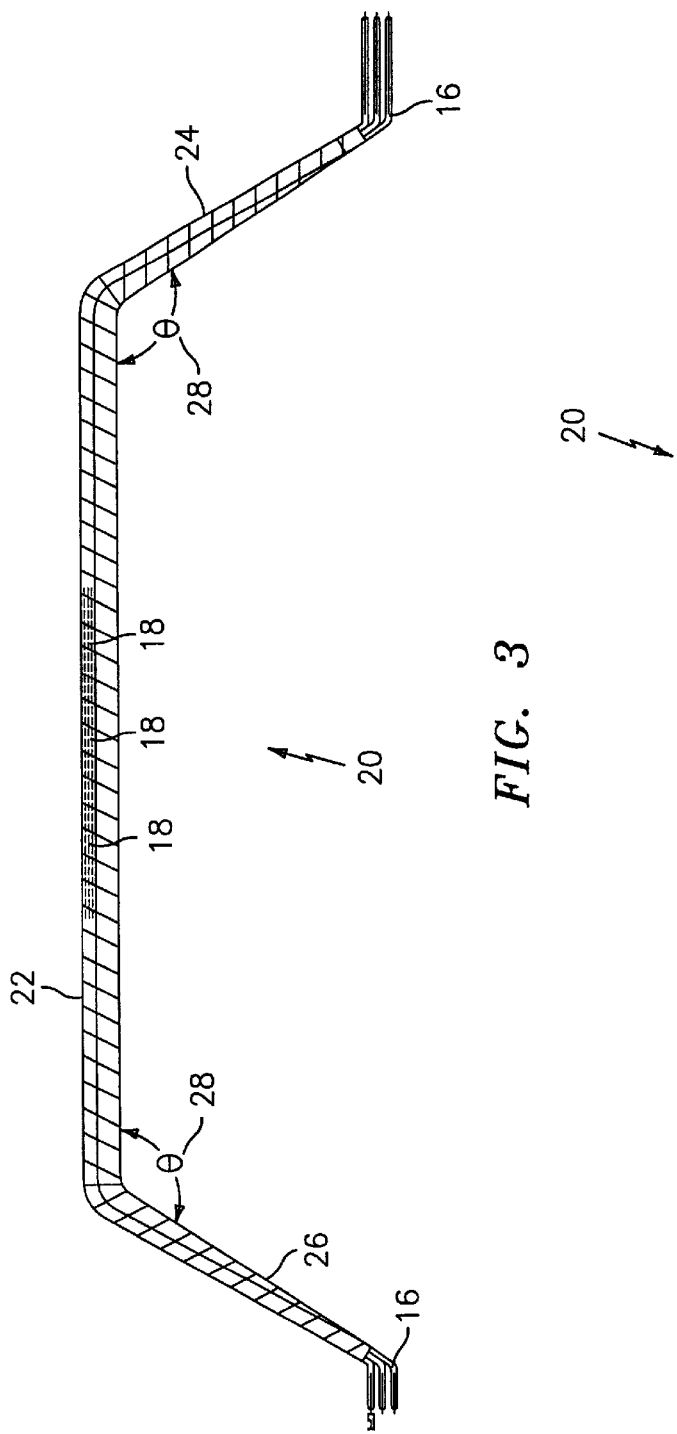
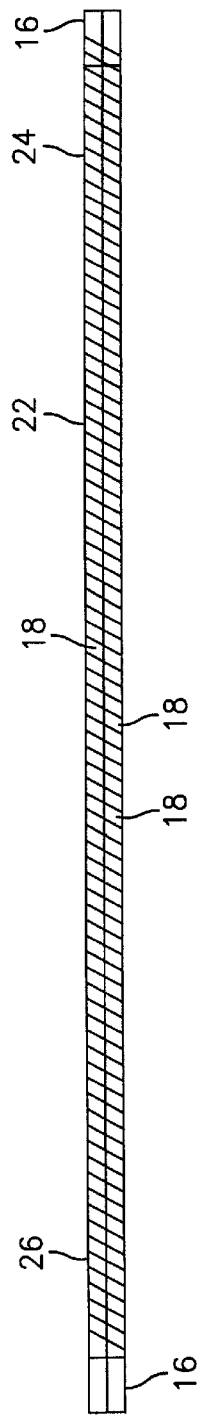
FIG. 3
FIG. 4

ASSEMBLY LINE METHOD FOR AND METHOD OF PRODUCING ARMATURE COILS

CROSS-REFERNCE TO RELATED APPLICATIONS

This application is a continuation of U.S. patent application Ser. No. 09/826,129 filed on Apr. 4, 2001, which is now issued U.S. Pat. No. 6,536,093 which is based upon, and claims the benefits of, U.S. Provisional Patent Application No. 60/194,537, filed Apr. 4, 2000, the entire content of which is incorporated is reference herein in its entirety.

BACKGROUND

The motor building industry has maintained the traditional craft for half a century. Accordingly, making form wound armature coils was a labor-intensive operation. Lengths of insulated copper wire were formed to an approximate coil shape on crude manually run machines and then hammered into the final desired shape. One disadvantage of that process was that repeatedly hammering the lengths of wire resulted in some degradation of the properties of the copper wire and in turn the insulation on the wires. Another disadvantage was that it took as long as 15 minutes to shape the lengths of wire into the prescribed shape of the armature coil. Furthermore, it was difficult to produce armature coils within close tolerances, and poorly shaped coils were difficult to insert into the armature and often caused damage which resulted in future motor failures.

Attempts have been made to construct apparatus to shape copper wire in desired coil configurations in a controlled and automated fashion. However, no such apparatus has heretofore been available, much less one that advantageously first assembles the individual wires into a single wire pack and then forms the pack into the desired armature coil configuration. Rather, assembly lines of the related art have been limited to the batch-style methods of forming individual strands and pairs, followed by the assembly of these individual components into a coil.

SUMMARY

A semi-automated method for forming armature coils is disclosed herein. Each of the armature coils comprises a plurality of transposed wire pairs. The method for forming the armature coils includes joining a plurality of pairs of wires having offset segments along their lengths, wherein each pair of wires are in contiguous, surface-to-surface engagement with each other along a length defining said each pair of wires, insulating each of the transposed pairs of wires, assembling the plurality of the insulated transposed pairs of wires with the transpositions being staggered to create a pack, and forming the pack into an armature coil in an automated coil forming machine by bending the pack in two planes. The joining of the plurality of pairs of wires having the offset segments along their lengths is effectuated at a transposition point. Each pair of wires has a transposition at a unique point relative to others of the plurality of the pairs of wires forming the coils.

BRIEF DESCRIPTION OF THE DRAWINGS

FIG. 3 is a side view of a finished armature coil;

FIG. 4 is a plan view of a finished armature coil;

DETAILED DESCRIPTION

In the disclosed method, copper wire is continuously spooled from a reel and fed through a series of machines to form the finished armature coil having the configuration shown in FIGS. 3 and 4. The method comprises the steps of continuously advancing the copper wire fed from the reel, stripping insulating coating from the wire in selected locations along its length in preparation for cutting the wire and forming leads, offsetting the wire at one of a series of three sequential predetermined locations for the series of the wires forming the coil, cutting the offset wires from the reel such that each offset wire is of predetermined length and contains one of the offsets, sorting the offset wires according to the positions of the offsets, pressing the two corresponding offset wires together at their offsets to form transposed wire pairs, wrapping the transposed wire pairs with an insulating material to form packs, assembling three pairs of transposed wires together to form a pack, deforming and shaping the packs to form armature coils, flattening and trimming the leads of the armature coils to a predetermined length, and applying insulating tape on the formed armature coils intermediate the leads.

Figure 1:
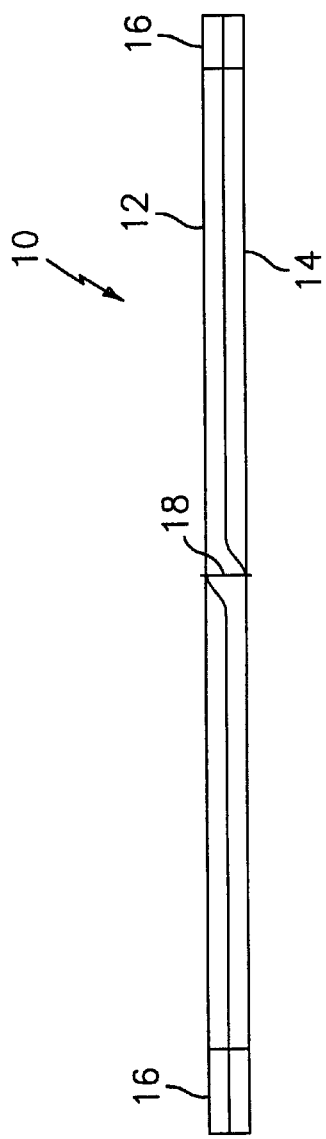
FIG. 1 is a plan view of a transposed pair of wires formed of two strands of copper wire and having leads on each end and a transposition formed intermediate the ends.
Figure 2:
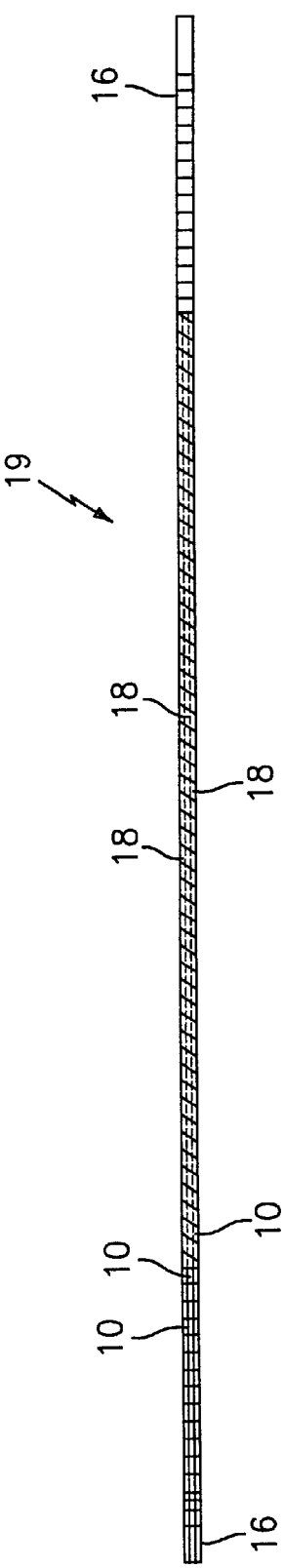
FIG. 2 is a side view of a pack of three pairs of transposed pair of wires.

Referring to FIG. 1, a transposed pair of wires is shown generally at 10. Transposed pair of wires 10 comprises two strands 12, 14 of copper wire pressed together axially to form a transposition 18 and having leads 16 formed on each end thereof. Leads 16 are defined by areas on each end of transposed pair of wires 10 where the polymeric material has been stripped away leaving only copper wire exposed. A finished armature coil (illustrated with reference to FIGS. 3 and 4), shown generally at 20, is constructed from a plurality of transposed pairs of wires 10 stacked together and wrapped with insulating tape to form a single pack 19 (illustrated with reference to FIG. 2). Each strand 12, 14 of transposed pair of wires 10 is coated with a polymeric material (not shown) that is predisposed on the copper wire. The construction of transposed pair of wires 10 from two strands 12, 14 of wire positioned in a parallel relationship minimizes the eddy current losses from each individual strand 12, 14. The presence of fluxes between strands 12, 14, however, which are not uniform and in fact vary radially in density, cause an induced voltage generated within formed armature coil 20 to vary from strand to strand when a plurality of transposed pairs of wires 10 are stacked together to form pack 19. This variance of the induced voltage causes excessive voltage losses and heating within formed armature coil 20. The presence of transpositions 18 introduced into the wire pairs assists in the amelioration of this variance.

The finished armature coil 20, as shown in FIGS. 3 and 4, is formed by the method disclosed herein. As can be seen in FIG. 3, finished armature coil 20 has a main body portion 22 with legs 24, 26 depending therefrom at an angle 28. The free end of leg 24 is a commutator end, and the free end of leg 26 is a pinion end. Leads 16 depend from each leg 24, 26 and are shaped and bent to extend away from each leg 24, 26 at various radii and are configured to extend parallel to main body portion 22. Each transposed pair of wires 10 used to construct armature coil 20 has transposition 18 formed therein at a point different from the points at which the transpositions 18 of the other two pairs of wire strands are formed in order to minimize the circulating electrical currents and overheating, as described above.

Finished armature coil 20 is configured such that transpositions 18 in each transposed pair of wires 10 are positioned at various points along the length of formed armature coil 20. In particular, transposed pairs of wires 10 are arranged into packs 19 such that a first transposition 18 is positioned substantially centrally on armature coil 20. A second transposition 18 and a third transposition 18 are each positioned equidistant from first transposition 18 but are disposed on opposing sides of first transposition 18. This staggering of the positions of transpositions 18 serves to minimize the circulating electrical currents and resultant heating of finished armature coil 20 during operation. The process of forming transpositions 18 is discussed below.

Referring back to FIG. 2, it can be seen that finished armature coil 20 comprises three transposed wire pairs 10 to form pack 19. Each individual transposed wire pair 10 has a rectangular cross sectional shape, and is arranged in a face-to-face orientation with respect to each other to form pack 19. Leads 16 are configured on the ends of pack 19 to define a space therebetween (as can be best seen in FIG. 3) and are dimensioned to be received and frictionally retained in the sockets of a riser of a commutator (not shown). The proper shaping of leads 16 is described below with reference to FIGS. 11 through 14. In its final form, armature coil 20 is defined by pinion end that corresponds to leg 26 and its associated leads 16 and commutator end that corresponds to leg 24 and its associated leads 16. Leads 16 associated with either end are distinct from each other, thereby rendering armature coil 20 polarized and enabling armature coil 20 to be installed in only a single orientation.

Figure 5:
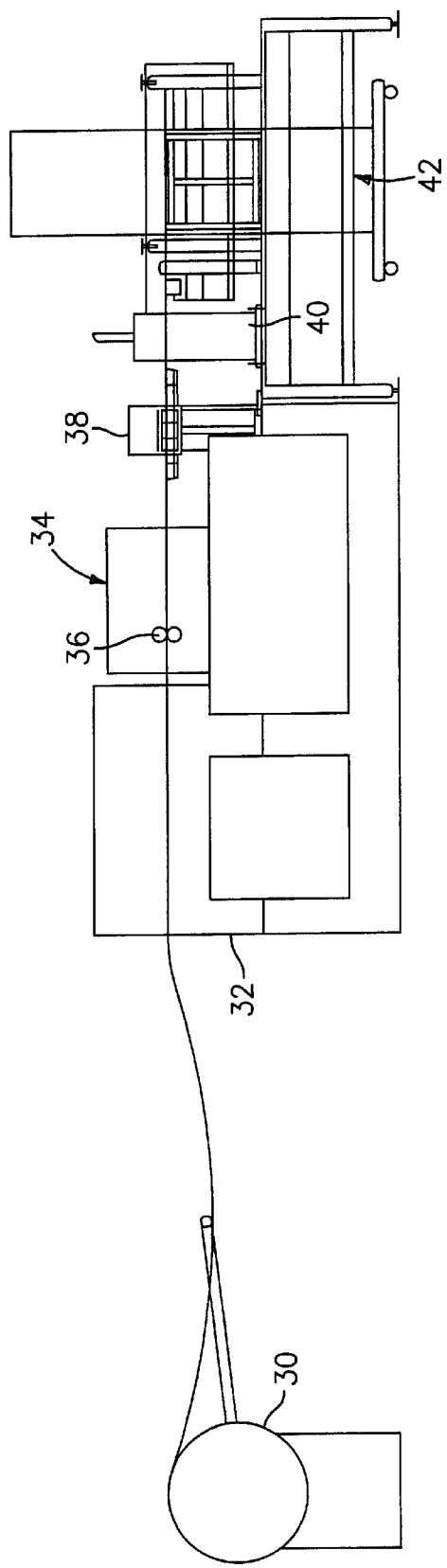
FIG. 5 is a side elevation view of copper wire being advanced from a reel and being sequentially fed into a wire straightening unit, a wire stripping unit, an offset forming unit, a cutting unit, and a sorting bin.

Referring to FIG. 5, the assembly line method of forming armature coil 20 is shown. The assembly process comprises advancing the copper wire through a series of machines to form the finished armature coil 20. The copper wire, which is coated with the polymeric material prior to being wound on a reel 30, is fed from reel 30 through a straightening apparatus 32. Because the wire has been wound on reel 30, the wire has been axially deformed and has a tendency to return to the wound position when unsupported. Straightening apparatus 32, which comprises a series of rollers (not shown), is configured to force the wire to bend in the opposite direction that the unsupported wire will tend to bend.

Once the wire is straightened and leaves wire straightening apparatus 32, it is fed into a wire stripping unit, shown generally at 34. In wire stripping unit 34, the polymeric coating is removed from portions of the copper wire that will ultimately correspond to leads 16 of the finished armature coil 20. The portions of the wire from which the polymeric coatings are removed are about two or three inches in length and vary with respect to whether the portion of wire will be used to form the top, middle, or bottom transposed pair of wires 10 in pack 19. The polymeric coating may be removed by a suitable abrasion mechanism, such as by brushing the copper wire with a wire brush (not shown) in the appropriate places, by passing the copper wire between wheels (not shown) having an abrasive coating disposed thereon, or by feeding the copper wire through a series of sanding drums 36 positioned to engage the wire in two planes and wherein each sanding drum 36 has an abrasive outer surface that contacts the coating. If the latter procedure is employed, as the outer surface of the polymeric coating on the wire is engaged by the abrasive outer surfaces of sanding drum 36, the polymeric coating is removed from selected locations along the wire.

Figure 6:
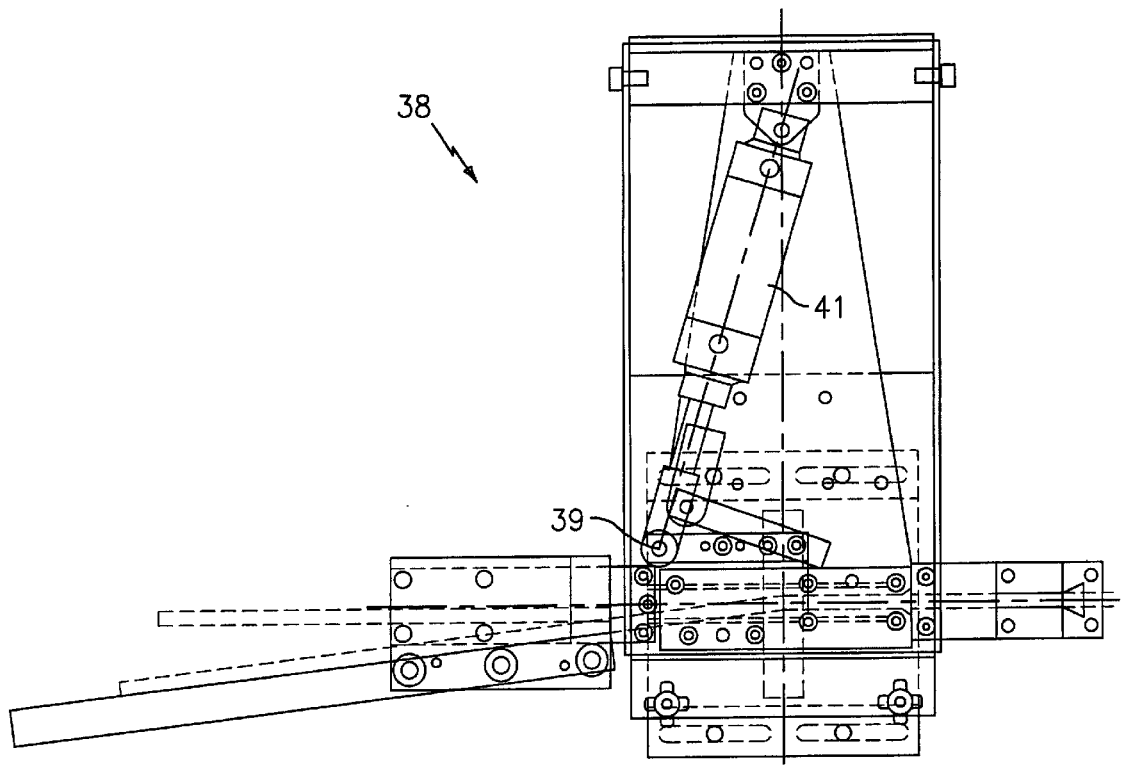
FIG. 6 is a plan view of the offset forming unit.

Referring to both FIGS. 5 and 6, after the copper wire is stripped of its polymeric coating from the portions that will be cut and formed into leads 16, the wire is fed into an offset assembly unit 38 where an offset is formed in the wire by a die 39 positioned on the end of a pivoting arm 41. The position of the offset in the wire, which is eventually used to form transposition 18, determines the position of the wire when it is assembled with other wires into pack 19. Offset assembly unit 38, which is shown in detail in FIG. 6, is electronically configured to vary the distance between an end stop for the wire and the transposition die, thereby varying the position of the offset placed into the wire. The lengths of wire for the three different offsets may be the same; however, three different lengths of offset wire are used to compensate for the bends of different radii in the offset wires to form leads 16, as is illustrated in FIG. 3.

Each finished armature coil 20 comprises at least three separate transposed pairs of wires 10 formed into pack 19, and each pack 19 is used to form finished armature coil 20. However, finished armature coil 20 forms only either a top or a bottom of a complete armature coil. A second assembly line of machines (not shown) similar to that of the first assembly line described above may be provided to form the corresponding finished armature coil needed to make a complete coil. The second assembly line machines would be programmed to account for the differences in the lengths of the copper wire, the lengths and locations of the exposed leads and the packs necessary to form the other finished armature coil for the complete coil.

Returning to the first assembly line, offset wire is fed from offset forming unit 38 to a cutting unit 40, in which the offset wire is cut at the exposed portions of the wire to yield a single offset wire terminating in leads 16 at each end. The offset wire is fed through one or more suitable wire length measurement sensors, such as a series of feed wheels coupled to encoders to measure lengths of the offset wire and to transmit an electronic signal to cutting unit 40, the abrasion mechanism and the offset forming unit. Cutting unit 40 is configured to receive the signal from the sensor and responds to the signal by severing the offset wire in predetermined locations in register with the locations on the wire at which the polymeric coating was removed. The offset wire is thereby transformed into a single discrete wire strand 12, 14 having an offset formed therein. Every third offset wire formed and severed from reel 30 has an offset formed therein in substantially the same place and is joined to a second similar offset wire in the assembly of a new armature coil 20. From cutting unit 40, offset wires are fed to a sorting bin, shown generally at 42.

Figure 7:
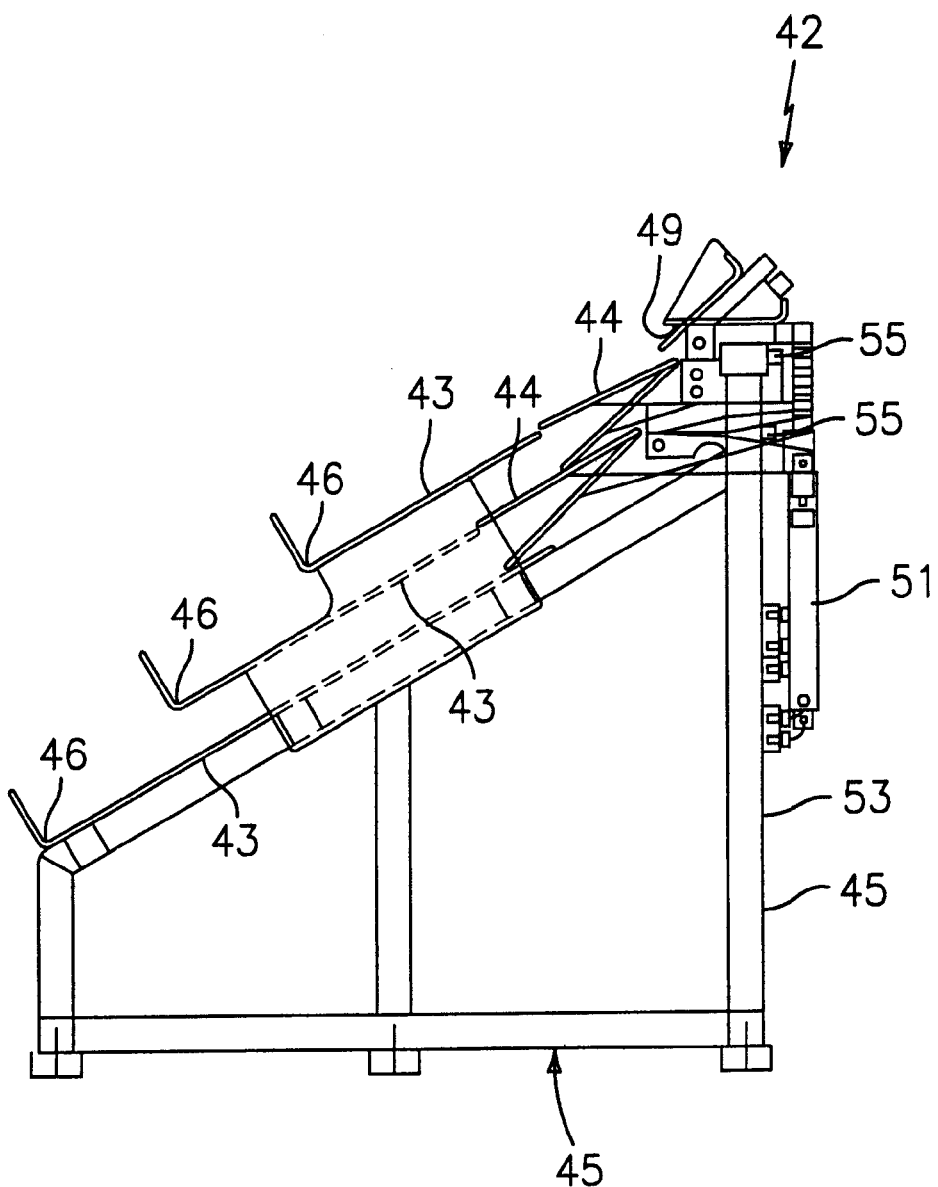
FIG. 7 is a side elevation view of the sorting bin.
Figure 8:
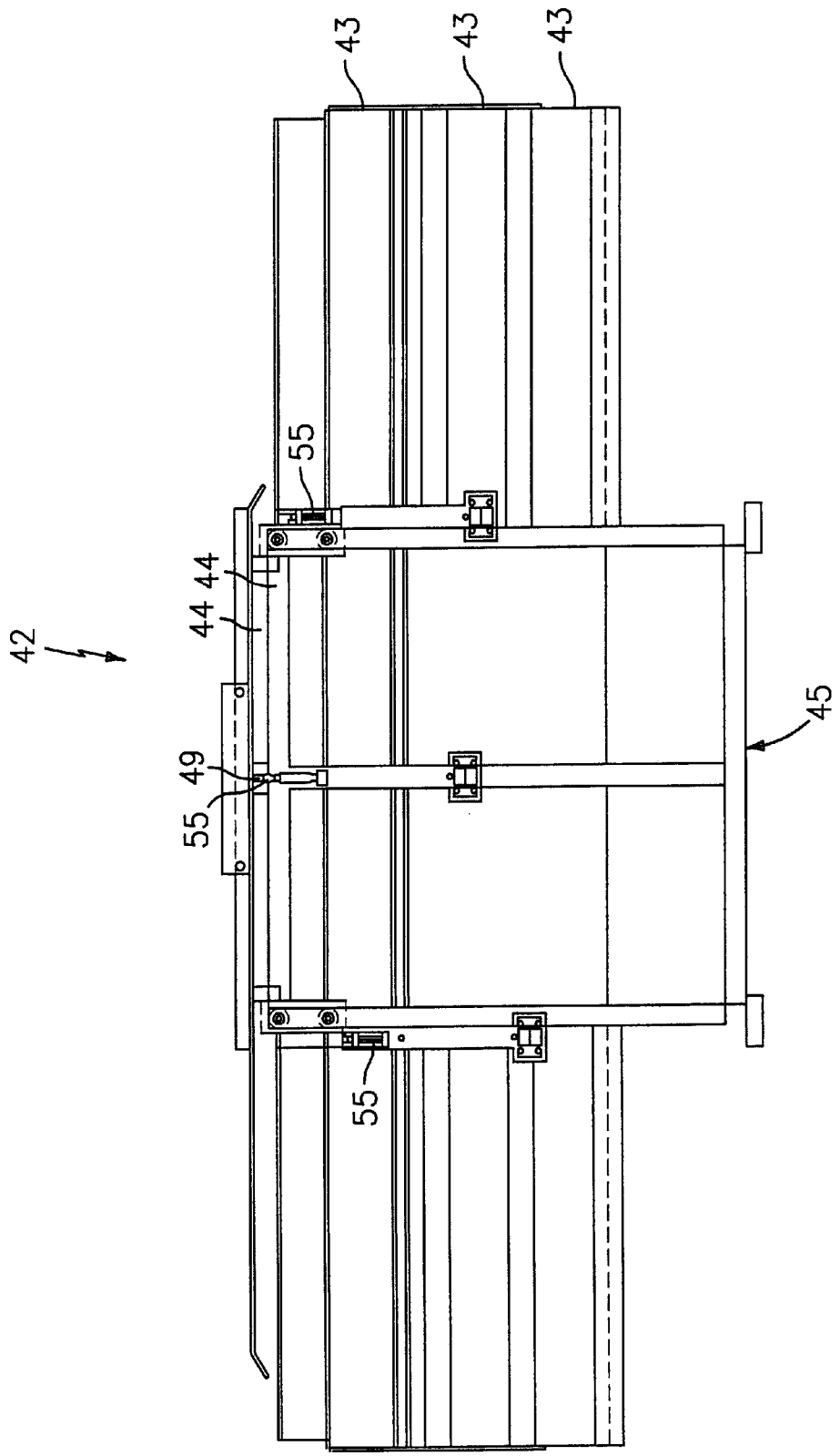
FIG. 8 is a front elevation view of the sorting bin.

Referring now to FIGS. 7 and 8, sorting bin 42 is shown in greater detail. Sorting bin 42 comprises a series of panels 43 horizontally arranged with respect to a level plane of a flooring surface on a support stand, shown generally at 45. Each offset wire is ejected from cutting unit 40 after being cut from reel 30 of copper wire and is received into an intake area, shown generally at 47, on an upper portion of sorting bin 42. Intake area 47 is pivotally mounted along a longitudinal axis 49 thereof on the upper portion of sorting bin 42. The pivotal motion of intake area 47 causes the offset wire received therein to drop onto panels 43.

A series of mechanical gates 44 formed within panels 43 are mechanically controlled to open and close in order to channel the offset wire into a designated compartment 46. One method of controlling gates 44 may be through the use of a pneumatic actuator. Gate operating mechanisms 51 are positioned on a back side 53 of sorting bin 42 and are pivotally connected to gates 44 through linkages 55. Gate operating mechanisms 51 are in electronic communication with cutting unit 40 and are configured electronically to respond to the sequential cutting of the offset wires such that the offset wires having offsets located in the same area along the length of the offset wires are deposited in the same compartment 46 in sorting bin 42. The operation of sorting bin 42 to separate the offset wires allows for the assembly line format of sequential stripping, offsetting, cutting, sorting, pressing, wrapping, assembling, forming, flattening, trimming, and re-wrapping of copper wire to construct each individual armature coil 20 while preventing the buildup of a large inventory of offset wires of a single configuration.

After being deposited into its appropriate compartment 46 in sorting bin 42, a pair of corresponding offset wires are removed from sorting bin 42. The two offset wires are fed into a press (not shown), which forces the offset wire strands 12, 14 into each other to form transposed pairs of wires 10 having transposition 18. After the transposition is formed, the wires are disconnected, an insulating spacer (not shown) is positioned between strands 12, 14 of each transposed pair of wires 10 proximate the point where strands 12, 14 contain transpositions 18, and the wires are fitted back together. The insulating spacer defines a distance between strands 12, 14, thereby serving to suppress radial fluxes generated between each strand 12, 14 of each transposed pair of wires 10. Utilizing a first wrapping machine (not shown), transposed pairs of wires 10 are then wrapped with an insulating tape (not shown), which further suppresses radial fluxes between strands 12, 14. The insulating tape is placed on transposed pairs of wires 10 intermediate the end portions, which will eventually be formed into leads 16.

Utilizing a second wrapping machine (not shown), three wrapped transposed pairs of wires 10, each having their transposition 18 in different locations along the lengths thereof relative to the other two wrapped transposed pairs of wires 10, are assembled and wrapped together with the insulating tape to form pack 19.

Figure 9:
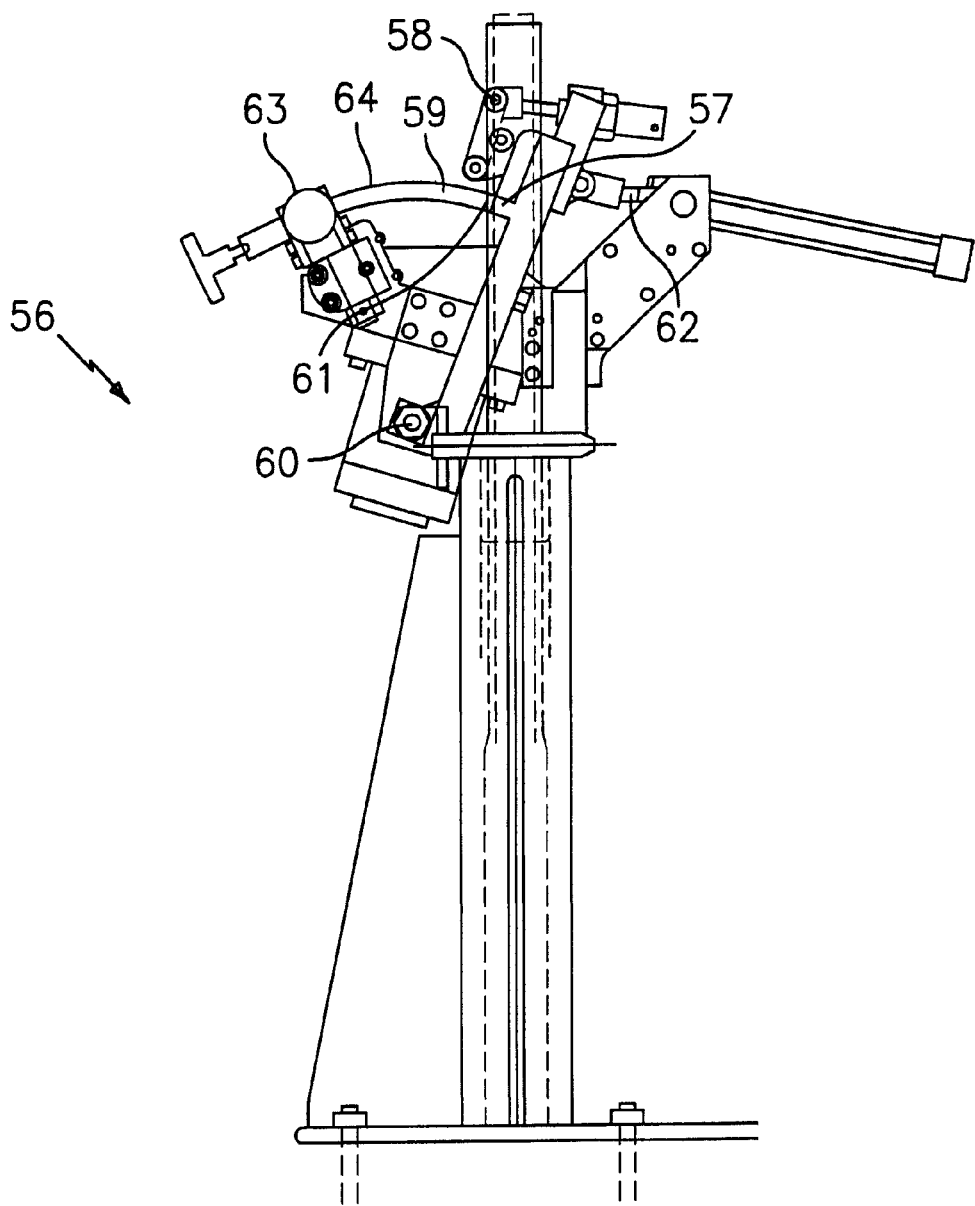
FIG. 9 is a side elevation view of a coil former.
Figure 10:
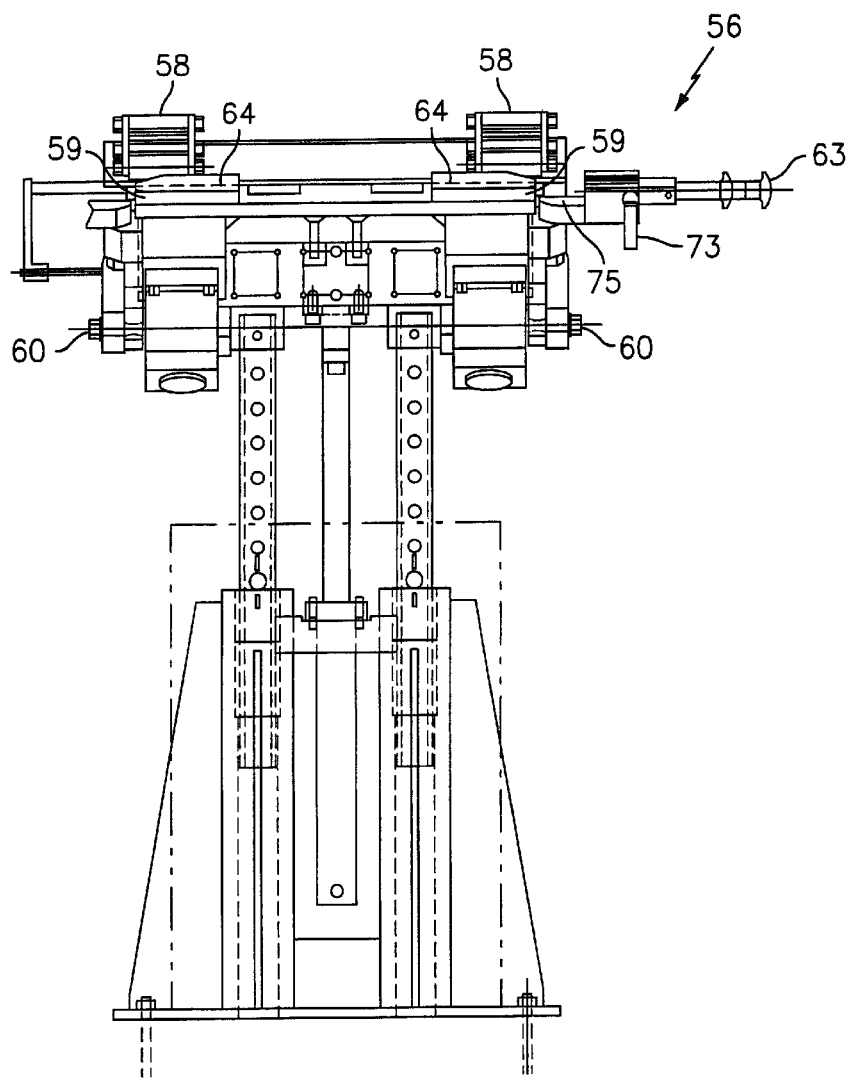
FIG. 10 is a front elevation view of the coil former.

Referring now to FIGS. 9 and 10, pack 19 is then fed by hand to an armature coil former, shown generally at 56, which deforms the entire pack 19 into the proper shape, thereby making it into armature coil 20. Armature coil former 56 is essentially a hydraulically powered "shaping device" on which pack 19 is bent in two directions to form legs 24, 26 of the finished armature coil 20. Armature coil former 56 comprises a pair of mounts 57 placed side-by-side, a pair of forms 59 placed side-by-side and proximate pair of mounts 57 to define a channel 61 therebetween, and lead benders 63. Forms 59 have an arcuate surface disposed on a face 64 thereof, which corresponds with the curve of legs 24, 26 of armature coil 20. Lead benders 63 are pivotally mounted at pivot point 75 proximate a lower surface of forms 59, one lead bender 63 being positioned on each side of forms 59.

Figure 11:
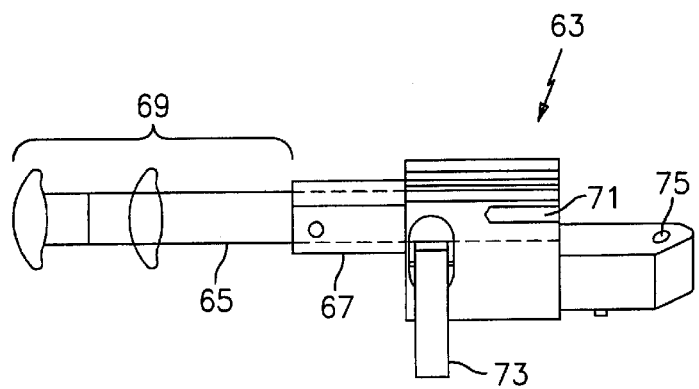
FIG. 11 is a side elevation view of a lead bender.

Lead benders 63, one of which is shown in FIG. 11, comprise a first member 65 slidably positioned inside a second member 67 to form a sliding assembly 69 and a series of lead holes 71 positioned longitudinally within first member 65 at an end thereof that is proximate a pivot point 75 thereof configured to receive leads 16 protruding from the ends of transposed pairs of wires 10. Each lead hole 71 is dimensioned and configured to provide a bend in the wire that is of the proper radius. A spring loaded handle 73 is perpendicularly attached to lead bender 63 and is in mechanical communication with both first member 65 and second member 67. Spring loaded handle 73 is used to lock first member 65 into an extended position relative to second member 67.

When pack 19 is mounted in channel 61, rollers 58, which extend under hydraulic power, force pack 19 to deform and to conform to the shape of the outer edges of forms 59. As the ends of pack 19 extend downward toward lead benders 63 and form legs 24, 26, lead benders 63 are pivoted to extend coaxially with legs 24, 26. The ends of legs 24, 26 are then inserted into lead holes 71, and first member 65 and second member 67 are locked into position by spring loaded handle 73. Finally, lead benders 63 are pivoted back to their original positions to form leads 16. More accurate positioning of leads 16 in the coil forming step decreases the amount of copper wire that must be trimmed in the shaping and trimming steps (described below), thereby resulting in a better fit with the riser of the commutator.

Figure 12:
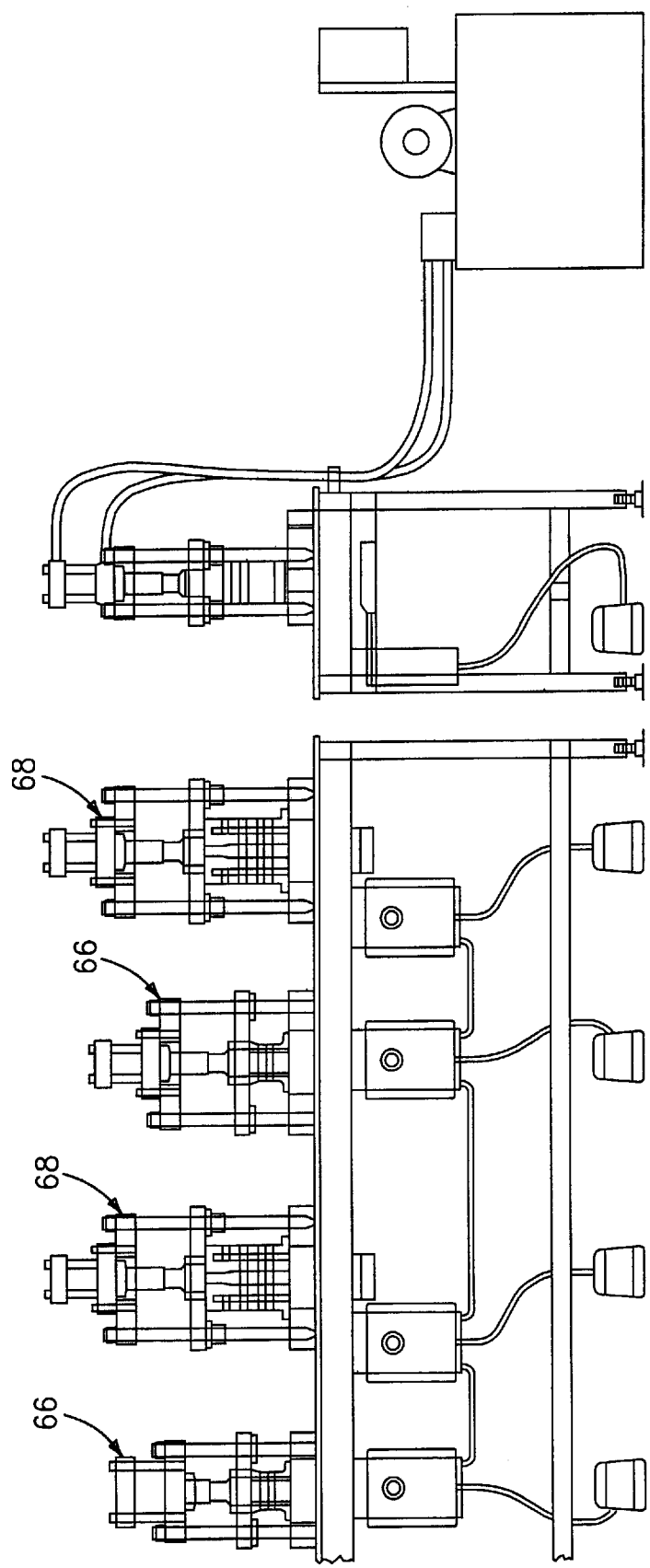
FIG. 12 is a side elevation view of coil presses and trimming units.

Referring now to FIG. 12, armature coils 20 are then transferred from coil former 48 to coil presses, which are shown generally at 66, and to trim units, which are shown generally at 68. Pinion end legs 26 and commutator end legs 24 of each armature coil 20 are flattened into thinner planar members by a flatten die (described below and shown with reference to FIG. 13) to properly shape leads 16 and are then trimmed by a trim die (described below and shown with reference to FIG. 12) to ensure that finished armature coil 20 meets desired dimensional specifications. Two separate coil presses 66 and two separate trim units 68 are utilized, each being preset to accommodate the dimensions of a corresponding pinion end leg 26 or commutator end leg 24 of armature coil 20.

Figure 13:
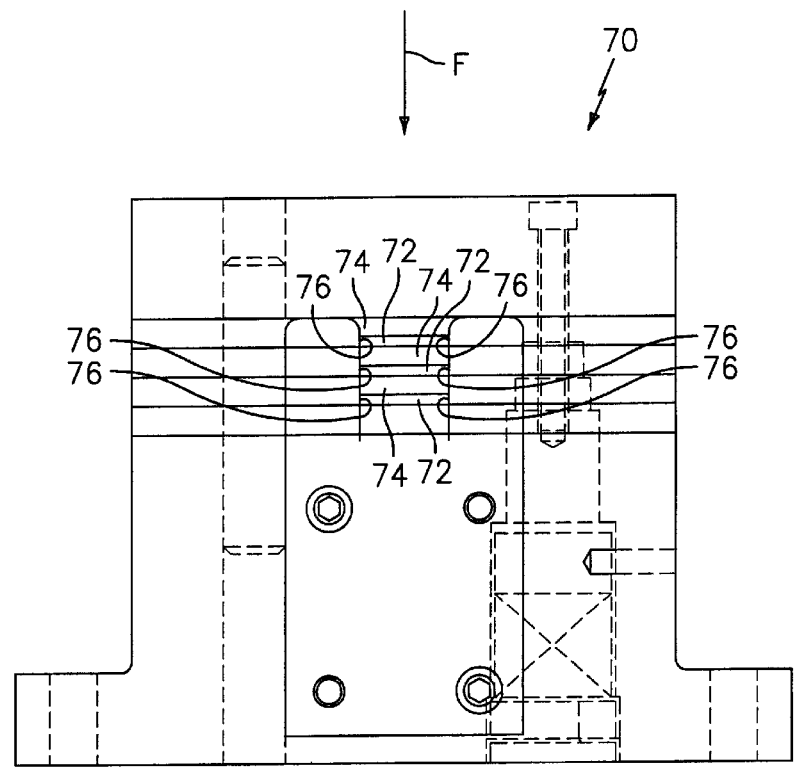
FIG. 13 is a side elevation view of a coil press die.

In FIG. 13, a flatten die used in coil presses 66 is shown generally at 70. Leads 16 are inserted into openings 72 between platens 74 of flatten die 70. Platens are then pressed together by a force F acting normal to the surfaces of platens 74. As leads 16 are pressed in the direction of force F, side surfaces 76 limit the deformation of leads 16 in lateral directions, thereby squeezing leads 16 into shapes having generally rectangular cross sections.

Figure 14:
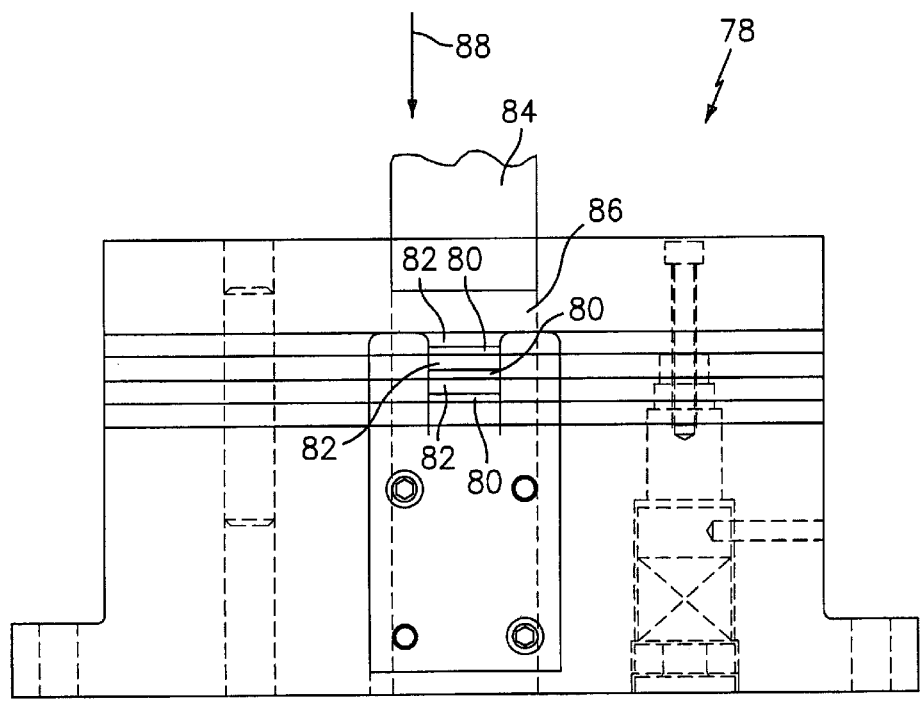
FIG. 14 is a side elevation view of a trim die.

Leads 16 protruding from the ends of armature coil 20 are then trimmed using a trimming die 78, shown in FIG. 14, to form the finished armature coil 20 having a preselected length. Leads 16, which have been previously shaped by coil presses 66, are inserted into openings 80 between platens 82 of trimming die 78 in a manner similar to that used in the shaping of leads 16. A punch 84 is positioned in an aperture 86 centrally located in trimming die 78. The movement of punch 84 within aperture 86 in the direction of an arrow 88 then forcibly cuts any parts of leads 16 that protrude through openings 80 into aperture 86, thereby trimming off excess material on the ends of leads 16 and ensuring that armature coil 20 is at the proper dimensions. The body portion of finished armature coil 20 intermediate leads 16 is then wrapped in insulating tape to electrically insulate the finished product.

Assembly of armature coils of the related art utilize methods in which transposed wire pairs are formed into the shape of a finished armature coil and subsequently assembled. The afore-described assembly line method provides superior control capabilities over the related art while minimizing the number and magnitude of process control problems. In particular, the methods of the related art in which strands of wire are offset, transposed, shaped, and then assembled into coils mandates strict tolerances in the manufacture of the wire. Such strict tolerances impede the processes of cutting and trimming the wire to accurately form leads. Automatic electronic control of the offsetting and cutting of the wire, as described herein, enables the strict tolerances of the related art systems to be relaxed, thereby allowing for faster production with less waste generated.

Further, the automated controls of the described assembly line provide significant flexibility of manufacture so that the lengths of the wire strips can be varied and controlled both as among the strips to account for the finished shape of the coil (such as the coil in FIG. 3) or overall to enable different coils to be manufactured. Moreover, the position and length of the removed portion of the insulation on the wire can be varied and controlled. In addition, the location of the offset along the length of the strands (or the elimination of the offsets altogether) can be varied and controlled to enable different coils to be manufactured, including coils without transpositions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A semi-automated method for forming armature coils comprising a plurality of transposed wire pairs the method comprising:

joining a plurality of pairs of wires having offset segments along their lengths at a transposition, with each pair having exposed ends and being insulated intermediate its ends, wherein each pair of wires are in contiguous, surface-to-surface engagement with each other along an entire length defining said each pair of wires intermediate its ends;

insulating each of said transposed pair of wires intermediate its ends;

assembling said plurality of said insulated transposed pairs of wires with said transpositions being staggered to create a pack; of generally uniform cross sectional area along an entire length of said pack intermediate the ends of the pairs of wire consituting the pack; and forming said pack into an armature coil in an automated coil formed machine by bending said pack in two planes.

2. The semi-automated method of claim 1 wherein said method further comprises pressing exposed ends of said packs to create flattened leads.

3. The semi-automated method of claim 2 wherein said method further comprises trimming said flattened leads to a preselected length.

4. An assembly line method for producing armature coils, said method having a plurality of discrete operations effectuated over a substantially equal period of time to result in a continual flow of said armature coils, said method comprising:

forming strands of wire of preselected varying lengths;

joining each strand of said wire of a preselected varying lengths with another strands of said wire of essentially the same preselected varying length in surface-to-surface engagement so as to form a transpositions between the strands therein at a point intermediate the ends thereof, such that cross sectional area of said joined strands are substantially uniform along an entire length of said joined strands intermediate the ends thereof, wherein said joined strands are in contiguous, surface-to-surface engagement with each other along said entire length defining said joined strands intermediate the ends thereof;

wrapping said joined strands of said wire; with the wrapped joined strands being of generally uniform cross sectional area along an entire length of said wrapped joined strands intermediate the ends of the joined strands deforming said wrapped joined strands into a configuration characteristic of said armature coil; and insulating a pack comprising a plurality of said wrapped joined strands.

5. The assembly line method of claim 4 wherein said forming said strands of said wire comprises:

advancing said wire from a reel of continuous wire;

removing an insulating coating disposed on said wire; and cutting said wire into said strands.

6. The assembly line method of claim 5 wherein said strands are sorted according to the preselected varying lengths of said strands.

7. The assembly line method of claim 4 wherein said joining said strands comprises:

offsetting corresponding pairs of said strands;

assembling said corresponding pairs of strands to form transpositions.

8. The assembly line method of claim 7 further comprising inserting an insulating spacer between said assembled corresponding pairs of strands.

9. The assembly line method of claim 7 wherein said assembling comprises:

pressing said offset pairs of said strands together;

disassembling said offset pairs of said strands;

inserting an insulating spacer between said offset pairs of said strands; and reassembling said offset pairs of said strands.

10. The assembly line method of claim 9 wherein said pressing of said offset pairs of said strands together comprises forcing said offset pairs of said strands into each other to form said transpositions.

11. The assembly line method of claim 4 wherein said wrapping said joined strands of said wire comprises:

winding a first insulating tape around said joined strands of said wire;

assembling a stack of said joined strands having said first insulating tape wound therearound; and winding a second insulating tape around said assembled stack of said joined strands.

12. The assembly line method of claim 4 wherein said deforming of said wrapped joined strands comprises shaping said wrapped joined strands to have planar leads at ends thereof.

13. The assembly line method of claim 12 wherein said deforming is effectuated mechanically and automatically.

14. The assembly line method of claim 13 wherein said deforming said wrapped joined strands is effectuated in a radical direction and a longitudinal direction relative to a longitudinal axis of said wrapped joined strands.

15. The assembly line method of claim 4 further comprising forming leads on opposing ends of said wrapped joined strands.

16. The assembly line method of claim 15 wherein said forming leads comprises:

shaping said opposing ends of said wrapped joined strands; and trimming said opposing ends of said wrapped joined strands.

17. The assembly line method of claim 16 wherein said shaping comprises deforming said opposing ends in a coil press.

18. The assembly line method of claim 17 wherein said deforming said opposing ends causes said opposing ends to have generally rectangular cross sections.

19. The assembline line method of claim 16 wherein said shaping comprises:

inserting said opposing ends between platens of a flatten die; and squeezing said opposing ends with said platens.

20. The assembly line method of claim 16 wherein said trimming comprises cutting material of said opposing ends to a preselected length.

21. The assembly line method of claim 16 wherein said trimming comprises:

inserting said opposing ends between platens of a trimming die; and cutting material of said opposing ends to a preselected length with a punch.

22. The assembly line method of claim 4 wherein said insulating said wrapped joined strands comprises further wrapping said joined strands with an insulating tape.

* * * * *